United States Patent [19]
Choi

[11] Patent Number: 6,021,105
[45] Date of Patent: Feb. 1, 2000

[54] KNIFE EDGE METHOD FOR USE IN AN OPTICAL PICKUP SYSTEM

[75] Inventor: Yang-Oh Choi, Seoul, Rep. of Korea

[73] Assignee: Daewoo Electronics Co., Ltd., Rep. of Korea

[21] Appl. No.: 08/958,805

[22] Filed: Oct. 27, 1997

[30] Foreign Application Priority Data

Oct. 28, 1996 [KR] Rep. of Korea ............... 96-49205

[51] Int. Cl.⁷ .................................................. G11B 7/00
[52] U.S. Cl. ............................. 369/112; 369/44.24
[58] Field of Search ........................ 369/44.23, 44.24, 369/110, 112, 118, 44.14

[56] References Cited

U.S. PATENT DOCUMENTS

| | | |
|---|---|---|
| 4,929,067 | 5/1990 | Sander . |
| 5,200,946 | 4/1993 | Fritz ........................................ 369/112 |
| 5,337,299 | 8/1994 | Takahashi ........................... 369/112 X |
| 5,568,462 | 10/1996 | Park ........................................ 369/112 |

FOREIGN PATENT DOCUMENTS

| | | |
|---|---|---|
| 0235304 | 9/1987 | European Pat. Off. . |
| 0439876 | 8/1991 | European Pat. Off. ............ 369/44.23 |
| 0543481 | 5/1993 | European Pat. Off. . |
| 0603458 | 6/1994 | European Pat. Off. . |
| 60-167132 | 8/1985 | Japan . |
| 62-202338 | 9/1987 | Japan . |
| 63-148438 | 6/1988 | Japan . |
| 63-149837 | 6/1988 | Japan . |
| 02162541 | 6/1990 | Japan . |
| 05266502 | 10/1993 | Japan . |
| 7105547 | 4/1995 | Japan . |
| 07176096 | 7/1995 | Japan . |

*Primary Examiner*—Paul W. Huber
*Attorney, Agent, or Firm*—Anderson Kill & Olick

[57] ABSTRACT

An optical pickup system reads an information signal stored on a recording surface of an optical disk. The optical pickup system comprises a light source for generating a light beam, an optical detector for detecting the information signal off the optical disk, an objective lens for focusing a portion of the light beam impinged thereonto on the optical disk, and converging the light beam reflected by the optical disk on the optical detector and a knife edge provided with a parallelopiped base, made of a material transparent to the light beam, a first and a reflection layers formed on the parallelopiped base, wherein the second reflection layer reflects the portion of the light beam to the objective lens and the first reflection layer reflects the light beam reflected from the optical disk to the optical detector to thereby allowing the optical pickup system to read the information signals off the optical disk.

9 Claims, 2 Drawing Sheets

KNIFE EDGE METHOD FOR USE IN AN OPTICAL PICKUP SYSTEM

FIELD OF THE INVENTION

The present invention relates to an optical pickup system; and, more particularly, to an improved knife edge method for use in the optical pickup system with a size reduced by incorporating therein a knife edge having a pair of reflection surfaces.

DESCRIPTION OF THE PRIOR ART

One of the common problems in an optical information recording disk, e.g., laser disk, lies in the occurrence of focusing errors. A knife edge method has been introduced to solve the problem.

In FIG. 1, there is illustrated a prior art optical pickup system 100 utilizing the knife edge method, as is disclosed in a copending commonly owned application, U.S. Pat. No. 5,568,462, entitled "KNIFE EDGE METHOD FOR USE IN DETECTING A FOCUSING ERROR SIGNAL IN AN OPTICAL PICKUP SYSTEM" and is incorporated herein by reference. The optical pickup system 100 comprises a light source 110, a knife edge 120, an objective lens 130, an optical disk 140 and an optical detector 150. In the system 100, the light beam emitted from the light source 110, e.g., a laser diode, enters the knife edge 120 and is partially reflected by a reflection surface 122 incorporated therein. The light beam reflected from the reflection surface 122 propagates through the objective lens 130 onto the optical disk 140 as a focused light beam. The focused light beam is reflected from the optical disk 140 and then passes by the knife edge 120. The knife edge 120 is arranged in such a way that the reflection surface 122 thereof is inclined at a predetermined angle Θ with an optical axis formed by the center point of the optical detector 150 and the focus point of the objective lens 130. The focused light beam that passed by the knife edge 120 impinges onto the photoelectric cells 152, 154 of the optical detector 150. Each of the photoelectric cells is capable of generating an output in the form of a light beam intensity measurement. Outputs from the first and the second photoelectric cells 152, 154 are sent to a pair of input ports 162, 164 on a differential amplifier 160 which generates a focusing error signal by comparing the outputs from the first and second photoelectric cells 152, 154 of the optical detector 150.

One of the major shortcomings of the above-described optical pickup system 100 is a large size thereof due to the location of the optical detector 150 which are placed opposite side of the optical disk 140 with respect to the knife edge 120, thereby making the overall size of the optical pickup system 100 bulky.

SUMMARY OF THE INVENTION

It is, therefore, a primary object of the present invention to provide an optical pickup system having a reduced size.

In accordance with the present invention, there is provided an optical pickup system for reading information signals stored on an optical disk by using a knife edge method, said system comprising: a light source for generating a light beam; an optical detector for detecting the light beam; an objective lens for focusing a portion of the light beam impinged thereonto on the optical disk, and converging the light beam reflected by the optical disk on the optical detector; and a knife edge provided with a first and a second surfaces, wherein the second surface reflects the portion of the light beam to the objective lens and the first surface reflects the light beam reflected from the optical disk to the optical detector to thereby allowing the optical pickup system to read the information signals off the optical disk.

BRIEF DESCRIPTION OF THE DRAWINGS

The present invention together with the above and other objects and advantages will become apparent from the following description of preferred embodiments, when read in conjunction with the accompanying drawings, wherein.

DETAILED DESCRIPTION OF THE PREFERRED EMBODIMENTS

Figure 1:
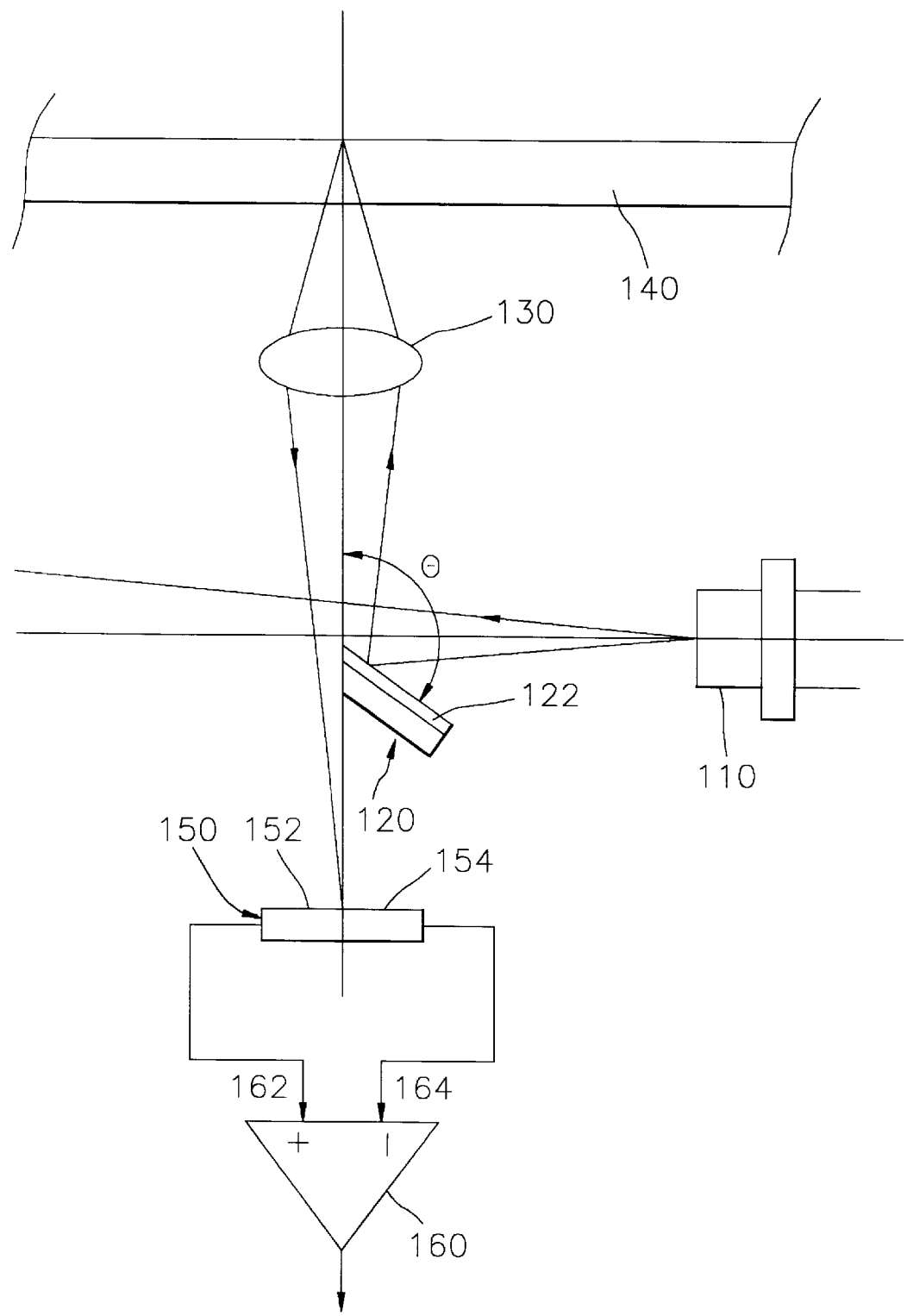
FIG. 1 represents a schematic side view of a prior art optical pickup system.
Figure 2:
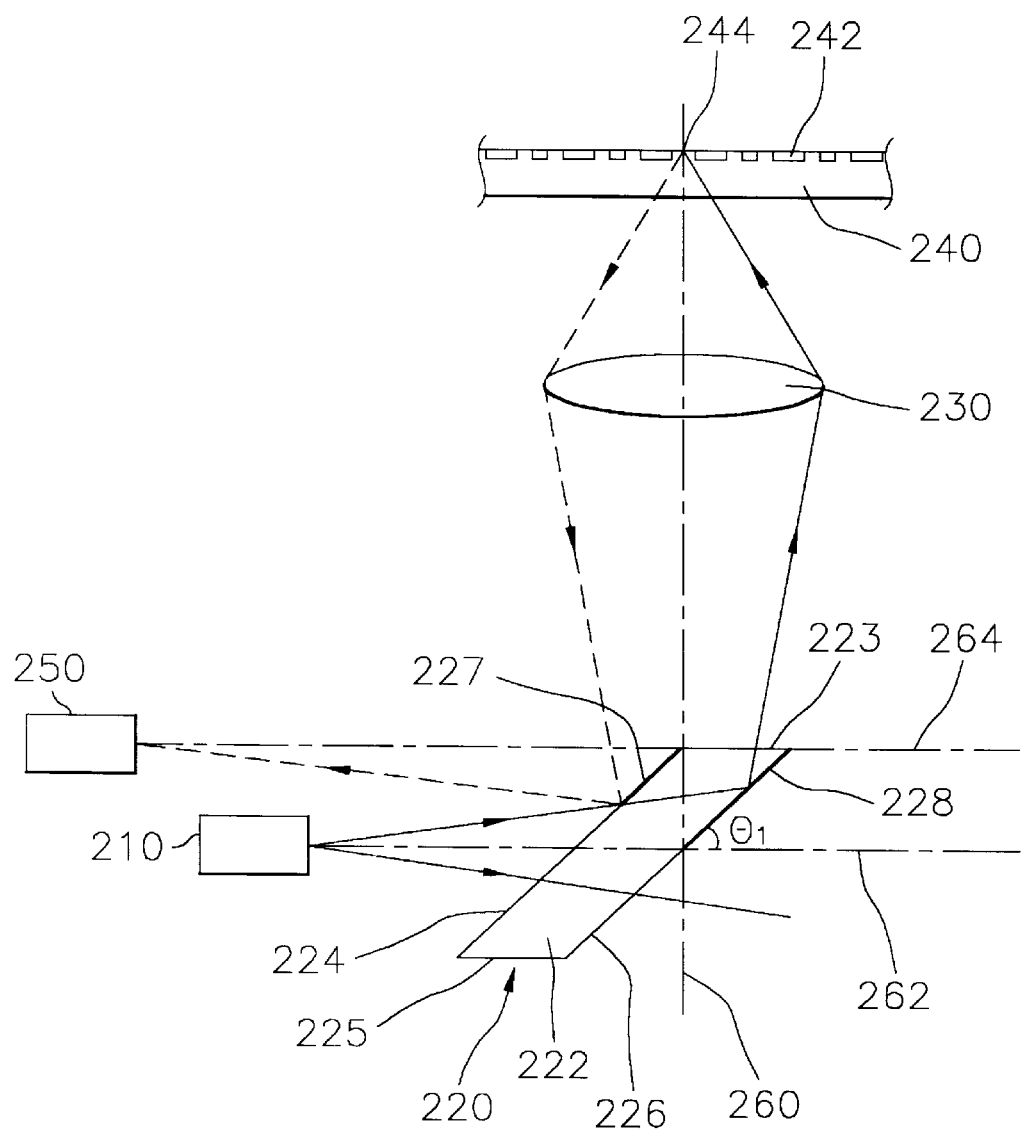
FIG. 2 represents a schematic side view of an optical pickup system utilizing an inventive knife edge in accordance with the present invention.

In FIG. 2, there is illustrated a schematic side view of the inventive optical pickup system 200 in accordance with the present invention comprising a light source 210, e.g., a semiconductor laser or a laser diode, for generating a light beam, an objective lens 230, an optical detector 250 and a knife edge 220 provided with a parallelopiped base 222 made of a glass transparent to the light beam, a top, a bottom, a first and a second side surfaces 223, 225, 224, 226, wherein the knife edge 220 may be produced, e.g., by depositing a material capable of reflecting the light beam on parts of the first and the second side surfaces 224, 226, respectively, thereby utilizing each part of the first and the second side surfaces 224, 226 as a first and a second reflection layers 227, 228, wherein the first reflection layer 227 extends downward by a first predetermined length from the top surface 223 and the second reflection layer 228 extends downward by a second predetermined length from the top surface 223. In the preferred embodiment of the present invention since the knife edge 220 is a parallelopiped, the top surface 223 is parallel to the bottom surface 225, the angle between the top and the first side surfaces 223, 224 is equal to that of the bottom and the second side surfaces 225, 226, and the second predetermined length is larger than the first predetermined length. Further, if the angle between the top and the second side surfaces 223, 226 is 45 degrees, it is preferable that the second predetermined length is equal to two times the first predetermined length.

In the system 200, the light beam emitted from the light source 210 enters the second side surface 226 of the knife edge 220, wherein an angle between the top surface 223 and the second side surface 226 is less than 90 degrees and an angle between the second side surface 226 and the bottom surface 225 is larger than 90 degrees. The second side surface 226 is arranged in such a way that a first optical axis 260 passes through the center of the top edge line of the first reflection layer 227 and the center of the bottom edge line of the second reflection layer 228, wherein the first optical axis 260 is formed by connecting the center point of the objective lens 230 and a focal point 244 of the objective lens 230. The light source 210 is positioned in such a way that the second side surface 226 is inclined at a predetermined angle $\Theta_1$, e.g., 45 degrees, with respect to a second optical axis 262 formed by connecting the center point of the light source 210 and the intersecting point of the first optical axis and the bottom edge line of the second reflection layer 228. It should be noted that a center line of the light beam emitted from the light source 210 is aligned along the second optical axis 262.

In this case, the second reflection layer 228 of the second side surface 226 serves as the knife edge, thereby the light beam emitted from the light source 210 is divided into two portions, i.e., a portion that is reflected to the objective lens 230 by the second reflection layer 228 through the top surface 223 of the parallelopiped base 222 and a remaining portion of the light beam that is transmitted through the remaining part of the second side surface 226 without making any contribution to reading information signals stored on an optical disk 240. And then, the objective lens 230 focuses the light beam impinging thereon on the recording surface 242 of the optical disk 240. Thereafter, the light beam reflected from the recording surface 242 of the optical disk 240 is converged on the optical detector 250 by the objective lens 230 after being reflected by the first reflection layer 227, wherein an angle between the top surface 223 and the first side surface 224 is larger than 90 degrees.

In FIG. 2, dotted lines represent optical paths of the light beam impinging onto the optical detector 250 reflected by the first reflection layer 227 of the knife edge 220 after being reflected from the optical disk 240. The optical detector 250 is placed at a focusing point of the light beam after being reflected from the first side surface 224. The position of the optical detector 250 may be adjusted by changing the predetermined angle $\Theta_1$, thereby allowing the optical detector 250 to be placed between the objective lens 230 and the light source 210.

The light beam passed by the first reflection layer 227 of the knife edge 220 impinges onto the photoelectric cells (not shown) of the optical detector 250. Each of the photoelectric cells is capable of generating an output in the form of a light beam intensity measurement. Outputs from the first and the second photoelectric cells are sent to a differential amplifier (not shown) which generates a focusing error signal by comparing the outputs from the first and the second photoelectric cells of the optical detector 250 to thereby allowing the optical pickup system 200 to read the information signals off the recording surface 242 of the optical disk 240.

In comparison with the prior art optical pickup system 100, the inventive optical pickup system 200 has a simpler structure. This is achieved by incorporating therein the knife edge 220 having the first and the second reflection layers 227, 228 for reflecting the light beam impinging thereon, wherein the second reflection layer 228 is able to reflect a portion of the light beam emitted from the light source 210 to the objective lens 230 and the first reflection layer 227 is able to reflect the light beam reflected from the optical disk 240 to the optical detector 250, thereby allowing the optical detector 250 to be placed between the light source 210 and the objective lens 230, which will, in turn, reduce the longitudinal size of the optical pickup system 200.

While the present invention has been described with respect to the preferred embodiments, other modifications and variations may be made without departing from the spirit and scope of the present invention as set forth in the following claims.

What is claimed is:

1. An optical pickup system for reading information signals stored on an optical disk by using a knife edge method, said system comprising:

means for generating a light beam;

means for detecting the light beam;

optical means provided with a first and a second surfaces, wherein the second surface reflects a portion of the light beam emitted from the generating means to the optical disk and the first surface reflects the light beam reflected from the optical disk to the detecting means to thereby allowing the optical pickup system to read the information signals off the optical disk, wherein the optical means includes a parallelopiped base, made of a glass transparent to the light beam, provided with the first and the second surfaces, wherein a part of the second surface is coated with material which is able to reflect the portion of the light beam incident thereon, the remaining part of the second surface transmits the remaining portion of the light beam and a section of the first surface is coated with the same material which reflects the light beam reflected from the optical disk to the detecting means; and an objective lens for focusing the portion of the light beam reflected from the second surface on the optical disk, and converging the light beam reflected by the optical disk on the detecting means after being reflected by the first surface of the optical means.

2. The optical pickup system of claim 1, wherein the second surface is arranged in such a way that a first optical axis passes through the center of a top edge line of the coated section of the first surface and the center of a bottom edge line of the coated part of the second surface, wherein the first optical axis is formed by connecting the center point of the objective lens to a focal point of the objective lens.

3. The optical pickup system of claim 2, wherein the generating means is located in such a position that the part of the second surface is inclined at a predetermined angle $\Theta_1$ with respect to a second optical axis formed by connecting the center point of the generating means to the intersecting point of the first optical axis with the second surface.

4. The optical pickup system of claim 3, wherein the predetermined angle $\Theta_1$ is 45 degrees.

5. The optical pickup system of claim 4, wherein the detecting means is placed at a focal point of the light beam after being reflected from the coated section of the first surface.

6. The optical pickup system of claim 5, wherein a center line of the light beam emitted from the generating means is aligned along the second optical axis.

7. The optical pickup system of claim 6, wherein the part of the second surface serves as the knife edge.

8. An optical device for use in an optical pickup system, said device comprising:

a parallelopiped base, made of a material transparent to a light beam for use in the optical pickup system, having a first, a second, a top and a bottom surfaces, wherein an angle between the first and the top surfaces is larger than 90 degrees;

a first reflection layer, made of a material capable of reflecting the light beam, formed on a section of the first surface, wherein the section extends downward by a first predetermined length from the top surface of the parallelopiped base; and a second reflection layer, made of the same material, formed on a part of the second surfaces, wherein the part extends downward by a second predetermined length from top surface of the parallelopiped base and the second predetermined length is larger than the first predetermined length.

9. The optical device of claim 8, wherein the angle between the top and the second surfaces is 45 degrees, and the second predetermined length is equal to two times the first predetermined length.

* * * * *